United States Patent
Ohruh

(10) Patent No.: US 8,695,737 B2
(45) Date of Patent: Apr. 15, 2014

(54) DEVICE ENABLING AN ELECTRIC WHEELCHAIR TO CROSS OBSTACLES

(75) Inventor: Michel Ohruh, Climbach (FR)

(73) Assignee: New Live, Climbach (FR)

( * ) Notice: Subject to any disclaimer, the term of this patent is extended or adjusted under 35 U.S.C. 154(b) by 0 days.

(21) Appl. No.: 13/577,255

(22) PCT Filed: Feb. 7, 2011

(86) PCT No.: PCT/FR2011/050250
§ 371 (c)(1),
(2), (4) Date: Aug. 9, 2012

(87) PCT Pub. No.: WO2011/095753
PCT Pub. Date: Aug. 11, 2011

(65) Prior Publication Data
US 2012/0304807 A1    Dec. 6, 2012

(30) Foreign Application Priority Data
Feb. 5, 2010  (FR) ...................................... 10 50828

(51) Int. Cl.
*B62D 61/10*    (2006.01)
(52) U.S. Cl.
USPC ...... 180/22; 180/9.32; 180/24.05; 280/304.1; 280/304.2
(58) Field of Classification Search
USPC .......... 280/304.1, 304.2; 180/9.32, 22, 24.03, 180/24.05, 24.07
See application file for complete search history.

(56) References Cited

U.S. PATENT DOCUMENTS

| | | | |
|---|---|---|---|
| 3,527,471 A | 9/1970 | Clark | |
| 4,817,747 A * | 4/1989 | Kopczynski | 180/22 |
| 4,840,394 A | 6/1989 | Bickler | |
| 5,076,378 A * | 12/1991 | Lagace | 180/9.1 |
| 5,515,935 A * | 5/1996 | Lagace | 180/9.1 |
| 5,515,936 A * | 5/1996 | Lagace | 180/9.1 |
| 5,842,532 A * | 12/1998 | Fox et al. | 180/6.48 |
| 6,625,967 B1 * | 9/2003 | Coisnon | 56/15.8 |
| 7,273,118 B2 * | 9/2007 | Huang | 180/65.1 |
| 7,726,689 B2 * | 6/2010 | Mulhern et al. | 280/755 |
| 8,186,463 B2 * | 5/2012 | Hunziker et al. | 180/65.1 |
| 2008/0143065 A1 | 6/2008 | DeFazio | |

FOREIGN PATENT DOCUMENTS

| | | |
|---|---|---|
| EP | 1 522 295 A2 | 4/2005 |
| JP | 7 051319 A | 2/1995 |
| WO | 2006/062905 A2 | 6/2006 |
| WO | 2008/097879 A2 | 8/2008 |

* cited by examiner

*Primary Examiner* — Toan To
(74) *Attorney, Agent, or Firm* — Andrew W. Chu; Craft Chu PLLC

(57) ABSTRACT

The device for crossing obstacles for a motorized vehicle includes a chassis connected to n (n≥3) wheels on each side, and a driver suitable for rotating the wheels. Each side of the chassis includes a mechanism comprising n−1 arms hingedly connected two-by-two about a shared pivoting axis on which the n wheels are distributed, respectively a front wheel, n−2 intermediate wheels, and a rear wheel. The mechanism allows each wheel to pivot relative to the axis of each adjacent wheel.

17 Claims, 6 Drawing Sheets

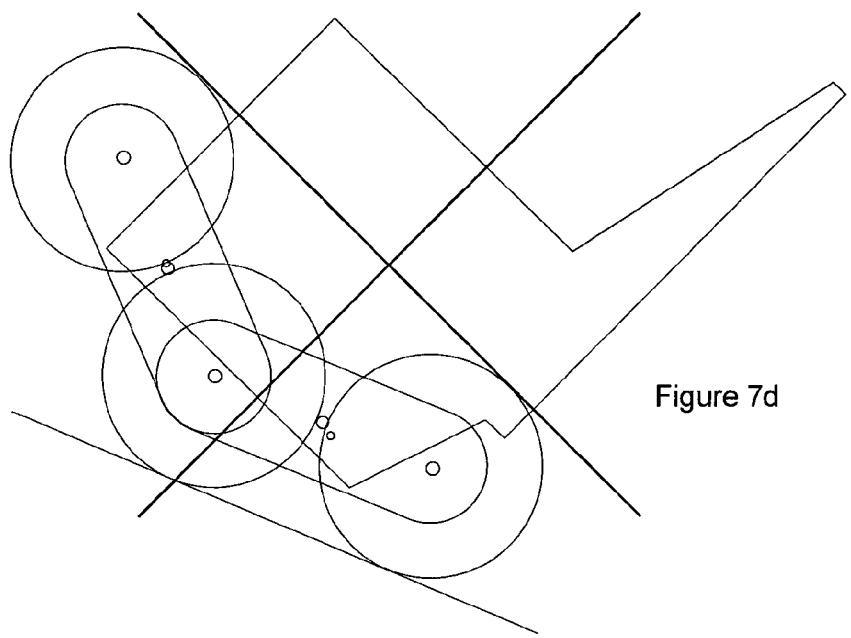
Figure 7d
Figure 7e
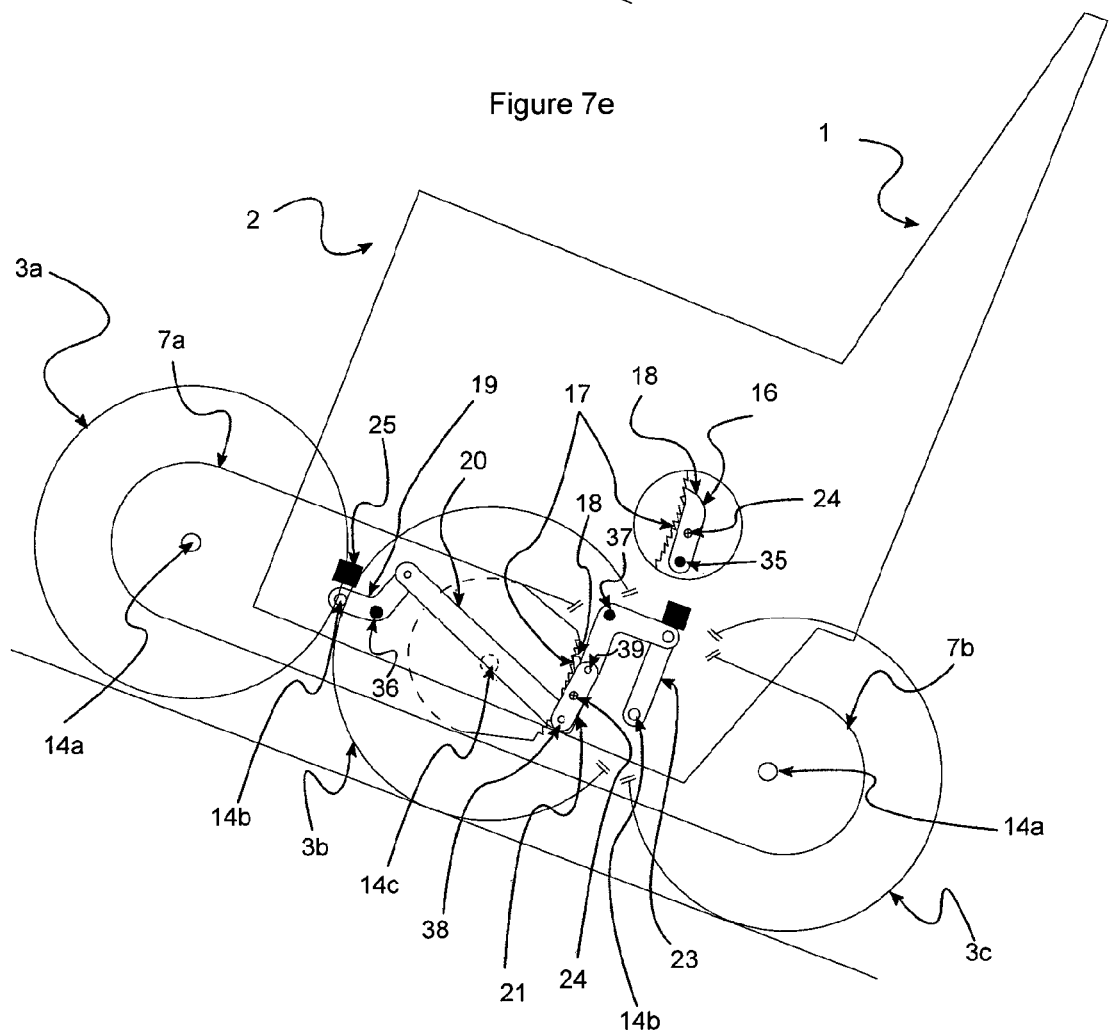

DEVICE ENABLING AN ELECTRIC WHEELCHAIR TO CROSS OBSTACLES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a device enabling a motorized vehicle to cross obstacles.

By motorized vehicle is understood any vehicle that is aimed at moving in an autonomous way, of the type robot, wheelchair, etc.

As an example, which will be the theme of the present description, the motorized vehicle will more specifically relate to a wheelchair.

This device enabling to cross an obstacle solves the current problems relating to the movement of disabled (disabled or elderly) people, who daily use a wheelchair both indoors and outdoors.

In today's society, the inclusion of people with disabilities is a priority in urban development projects, in housing adaptability, in access to roads and public or private transport.

Good accessibility determines social, educational and professional incorporation. Mobility and movement are the guarantee of the quality of daily life and at long term.

In order for freedom of movement to be real, the whole chain of movement must meet people's specific needs.

The first element of this chain of movement is unquestionably the wheelchair, which is a technical aid to mobility by permitting to easily transport a person on a flat surface.

Since urban development projects are slow to be implemented, in the range of a few years, the wheelchair must adapt to the current state of cities, roads, housing, etc.

Now, the roads have many sidewalks, businesses often have a step, the housings have sometimes a difference in level from one room to another, etc. A wheelchair should be capable of crossing these obstacles.

2. Description of Related Art Including Information Disclosed Under 37 CFR 1.97 and 37 CFR 1.98.

Many solutions have been provided for this purpose. Amongst them, wheelchairs with a six-wheel technology are available on the market. They have good maneuverability and stability, but crossing an obstacle is limited to small heights (less than 7.5 cm) and then only with a pavement-leverage option that acts as a lever to lift the front wheels.

Other 4×4-type wheelchairs exist and permit to move on any type of ground (grass, gravel, pebbles) and to cross obstacles up to 15 cm. The main disadvantage of these chairs resides on the one hand in their imposing size, which impedes their use indoors and on the other hand in their lack of stability, because there is a risk of tilting forward or backward when crossing an obstacle.

SUMMARY OF THE INVENTION

The present invention copes with these disadvantages by providing a compact electric wheelchair capable of crossing obstacles of an height of up to 20 cm and this according to all angles of attack in forward direction, without any risk of tilting, thus making the driving easier, namely for users who have difficulties for understanding the small obstacles.

Another advantage of this chair resides in that it allows driving in the countryside in grass, gravel, pebbles, but also in snow and sand.

Other advantages will become clear from the following description.

To this end, the wheelchair is equipped with a device for crossing an obstacle comprised of:
a chassis connected to n (n≥3) wheels on each lateral side;
driving means capable of causing the wheels to rotate.

On each lateral side of the chassis is located a mechanism including n−1 hinged arms, over which the n wheels are distributed, respectively a front wheel, n−2 intermediate wheels and a rear wheel. The hinged arm mechanism enables each wheel to pivot with respect to the axle of each adjacent wheel.

In other words, this device has the following peculiarity: the distance between two adjacent wheels is always fixed, in order to avoid packing them. The wheels can move in height independently from each other when they find an obstacle. Specifically, when the chair arrives in front of a sidewalk, the two front wheels will pass onto it first, while the other wheels remain in contact with the ground. Then the following two wheels arrive in front of the sidewalk and pass onto it, the other wheels remaining in contact with the ground, and so on. Finally, the two rear wheels pass onto the sidewalk, the front wheels remaining on the ground. At any time, the chair has more than three resting points, so as to define a plane that provides the chair with stability.

According to the invention, the arms are hinged two by two about a shared axis corresponding to an axis of rotation of an intermediate wheel.

The driving means located under the seat of the chair are connected to one of the hinged arms of the mechanism by a motor shaft. This motor shaft drives the wheels in rotation through transmission means arranged between the motor shaft and the wheel axles.

Preferably, the driving means consist of at least two motors placed under the chair on both sides of a transverse median plane with a vertical appearance. One of the motors powers the left side wheels, and the other motor powers the right side wheels. As mentioned above, each motor is connected in turn to one of the hinged arms of the mechanism by a motor shaft.

According to another possibility, the driving means could be mounted directly on the axle of a wheel, or also integrated directly into the wheels.

The fact that the left side wheels are powered independently from the right side wheels enables the chair to rotate by 360° on itself. This capacity provides an important advantage to the wheelchair user, since the movement is largely facilitated. For example, it is no longer necessary to have a sufficient setback distance or steering angle to turn around. Generally, during a rotation, the size of the chair is limited to its outer dimensions. This chair is thus easier to be used, namely for users with cognitive impairment, and having an electric control at hand.

According to one possibility, the chassis of the chair is connected to each hinged arm mechanism through two shafts, one shaft being capable of compensating for the change in distance between these two shafts when the arms are not aligned in a horizontal plane. Indeed, when passing an obstacle, the wheels are not aligned, and the hinged arms rotate accordingly and form an angle leading to bringing the two shafts closer to each other. Now, the chassis has fixed dimensions and is connected to these two shafts. In order to avoid any deformation or break of the chassis, it is thus essential to be able to compensate for the change in distance between the shafts for securing the hinged arms with respect to the distance between the shafts for fixing these same shafts to the chassis, when crossing an obstacle.

According to a first variant, this requirement can be met by a shaft such as a crankshaft comprised of two cylindrical sections offset with respect to each other. This offset compensates for the change in distance between two shafts when the wheels are not aligned.

According to a second variant, the shaft of the crankshaft type can be comprised of a first shaft section connected to a hinged arm and a second shaft section connected to the chassis, the two shaft sections being hinged together by a connecting rod.

According to a third variant, this condition can be met by a sliding shaft in a horizontal plane between two stops defining the maximum and minimum distance allowed between the two shafts. This sliding shaft permits to vary the distance between the two shafts at the level of the hinged arms or at the level of the chassis. For example, this sliding shaft can be inserted either in a horizontal slot provided for this purpose in a hinged arm or in a horizontal slot provided for this purpose in the chassis.

As mentioned above, one of the main advantages of the present invention is its stability. This is enhanced by a front and/or rear anti-tilting device.

Indeed, during a movement down a slope, the chair will tend to lean forward, thus relieving the rear portion. Then it is wise to impede the rear wheel from lifting alone with respect to the wheels placed before the latter. Without this anti-tilting device, the chassis would tilt forward while lifting the rear wheel, causing a dangerous situation for the user. The situation is similar when climbing a slope, where there is a risk of lifting the front wheel.

To this end, the front and/or rear anti-tilting device of the invention comprises, on each lateral side of the vehicle, means for locking the pivoting of at least one hinged arm during the tilting forward or backward of the chassis.

More specifically, said means for blocking the pivoting of the hinged arms during the tilting forward or backward of the chassis consist of a pawl for locking the pivoting of the rear and front arms, respectively, which it is connected to by means of a double linkage transforming the change in distance between the chassis and the hinged arms into a movement of the pawl so that one of its ends cooperates with a toothed edge of said locking means and locks said pivoting.

In practice, both linkages each consist of a knee joint the distal rods of the pawl of which are driven by the front or rear arm, respectively, and the proximal rods of the pawl of which are hinged to both ends of a rod including a hinge bolt about which pivots the pawl, one end of which is hinged to the chassis, one of the rods of each knee joint being also hinged to the chassis.

In addition to the anti-tilting device, the device for crossing obstacles is improved by means of a device assisting the crossing of the rear portion of the vehicle. This additional assisting device includes on each lateral side of the vehicle a anti-tilting wheel positioned at the rear of the vehicle, attached to one end of a rod hingedly connected to the chassis and a rod connecting it to damping means. This rod is pivotally connected to a knee joint the distal rod of damping means of which is hingedly connected on the one hand to the chassis in front of the central axis of the rear arm and on the other hand to said rear arm at the level of its central axis.

Specifically, this device assisting the crossing affects the pivoting of the hinged arms to the position of the wheel, the latter being held in an raised position with respect to the ground during the movement on a flat surface and pressed on the ground during the crossing of an obstacle by the rear wheel.

Advantageously, the damping means consist of a connecting rod with a variable length, such as a cylinder or damper with an axial spring, pivotally mounted on the chassis, capable of being elastically compressed when the wheel is pressed on the ground. These damping means are aimed at absorbing part of the load borne by the rear wheel when it crosses an obstacle. The cylinder/damper is relaxed during rolling on the flat ground, and compressed when crossing an obstacle.

According to the invention, a wheelchair equipped with the device for crossing an obstacle does not exceed the dimensions of a standard electric wheelchair dominantly for use indoors, thus adapted for passing doorways, transportation.

According to one possible configuration, at least one set of wheels can be provided with flexible high blades in the direction of the axis of pivoting of the wheels, preferably the fore-carriage or rear-carriage. This configuration permits to prevent premature wear of tires caused in particular by the rotation of the chair on itself, which causes the tires to move. This type of wheel has an additional advantage because the high blades can act as a toothed sole for easier rolling in the snow or sand.

According to another possible configuration, at least one set of wheels can be equipped with omnidirectional wheels, preferably the fore-carriage or rear-carriage. This configuration permits to prevent premature wear of tires during rotation of the chair on itself, which it therefore facilitates.

In order to make more flexible and to further facilitate the crossing of an obstacle, additional wheels for example with tires with raised patterns such as studs can be added between two adjacent wheels, laterally recessed with respect to the wheels that already exist. These additional wheels i.e. enable the chair to climb stairs.

In order to minimize the stresses, which can be exerted on the surfaces of adhesion of the wheels on uneven ground or when crossing obstacles, at least one wheel can be mounted on a hub flexible in rotation, i.e. with an elastic clearance at the level of its axis of rotation, and/or on a free-wheel hub, i.e. the wheel is driven only in one direction.

Another option would consist in equipping the wheelchair with a tilting seat provided with a level sensor, so that the seat always remains positioned horizontally, regardless of the location of the chair. This tilting seat significantly improves the comfort of the passenger.

According to a final advantage, this wheelchair, equipped with the device for crossing an obstacle, can be dismantable.

Hereinafter the invention will be described in more detail, according to possible configurations, with reference to the attached figures.

BRIEF DESCRIPTION OF THE DRAWINGS

FIGS. 7b to 7e show schematic views to represent a risk of tilting forward and rearward.

FIG. 6.

DETAILED DESCRIPTION OF THE DRAWINGS

Figure 1:
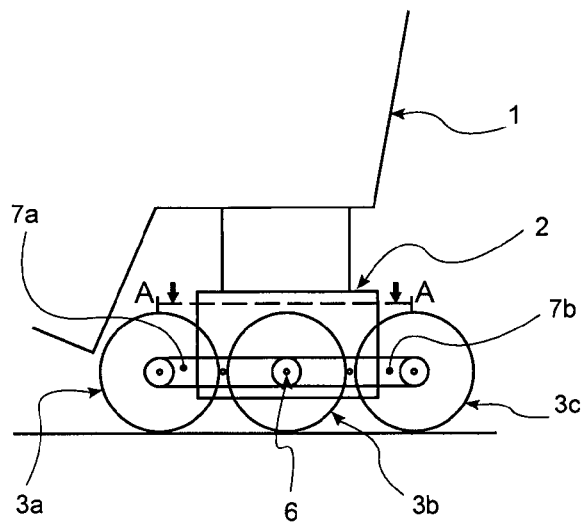
FIG. 1 is a highly schematic side view showing the wheelchair flat.

When referring to FIG. 1, the device for crossing an obstacle of the invention is comprised of a chassis (2), to which is fixed a chair (1), three wheels (3a, 3b, 3c) in a line on each lateral side of the chassis (2), and a mechanism comprising two hinged arms (7a, 7b), over which are distributed the three wheels in a line (3a, 3b, 3c).

The front wheel (3a) is positioned before the first hinged arm (7a), the intermediate wheel (3b) is positioned at the joint between the two arms (7a, 7b) and the rear wheel (3c) is positioned behind the second hinged arm (7b). The two arms (7a, 7b) are thus hinged about a shared axis corresponding to the axle (6) of the intermediate wheel (3b).

The joint between the two arms (7a, 7b) corresponds to a pivoting connection. This allows the front (3a) and rear (3c) wheels to pivot about the axle (6) of the intermediate wheel (3b). The three wheels (3a, 3b, 3c) can thus move up and down independently from each other when crossing an obstacle.

Figure 2:
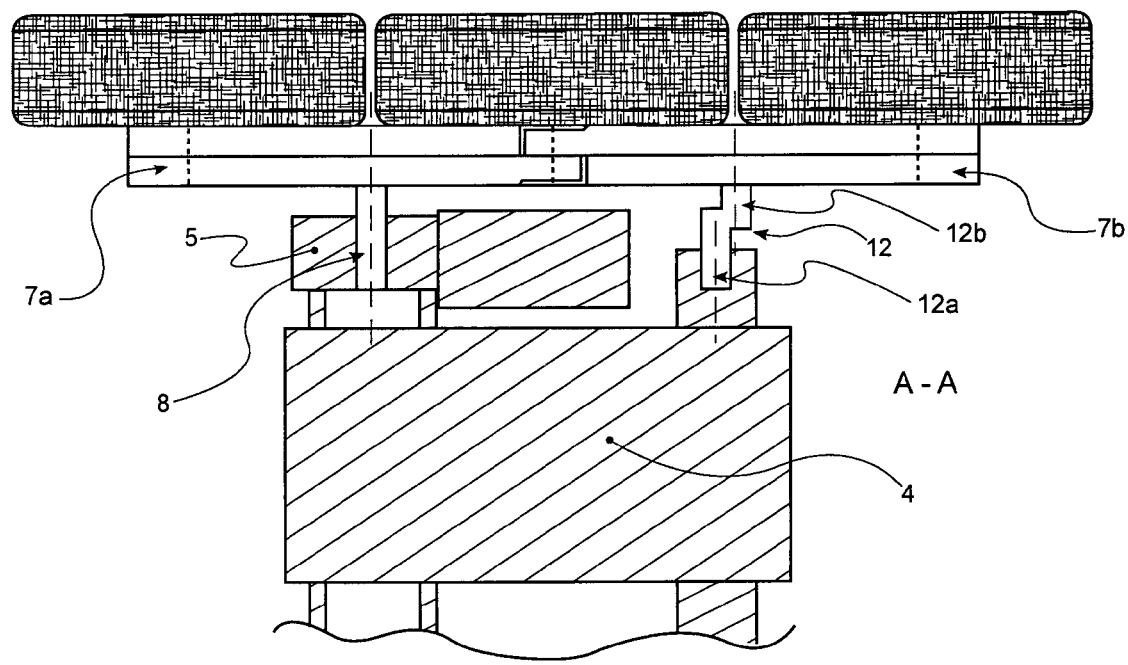
FIG. 2 shows a partial view of the chair in a cross-sectional view AA.

FIG. 2 reveals part of the electrical system located under the seat of the chair (1). There is a battery pack (4) connected on each lateral side to the front of the mechanism with hinged arms (7a, 7b) through a motor (5) and a motor shaft (8), and to the rear of the mechanism by a loosely mounted axle such as a crankshaft (12). The battery pack (4) is in turn fixed to the chassis (2) of the chair. The axis of the crankshaft (12) is comprised of two shafts (12a, 12b) having their axes of rotation slightly offset with respect to each other, the first shaft (12a) being integral with the battery pack (4), while the second shaft (12b) is integral with a hinged arm (7b).

Figure 6:
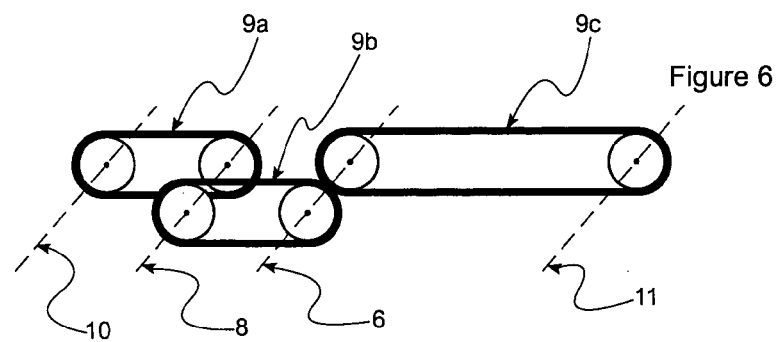
FIG. 6 shows schematic view of a possible configuration of the transmission means.

As shown in FIG. 6, the motor shaft (8) causes the three wheels in a line (3a, 3b, 3c) to rotate, through three transmission chains or belts (9a, 9b, 9c) arranged between the motor shaft (8) and the axle of the front wheel (10), between the motor shaft (8) and the axle of the intermediate wheel (6), and between the axle of the intermediate wheel (6) and the axle of the rear wheel (11), respectively. The driving means transmit a rotational motion to the wheels (3a, 3b, 3c), independently between the left side wheels and the right side wheels. Thanks to an electric hand control, the user can for example decide to cause the left wheels to rotate in the direction opposite that of the right wheels, in order to control a rotation of the chair on itself. He can also negotiate a long turn by controlling the motor so as to cause the right (respectively left) wheels to rotate faster than the left (respectively right) wheels.

Figure 3:
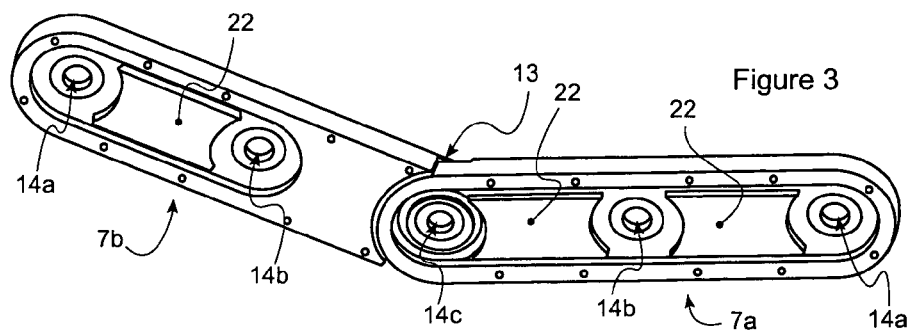
FIG. 3 shows an enlargement of the schematic view of the mechanism with hinged arms, on the side of the chassis, without protection cover.
Figure 4:
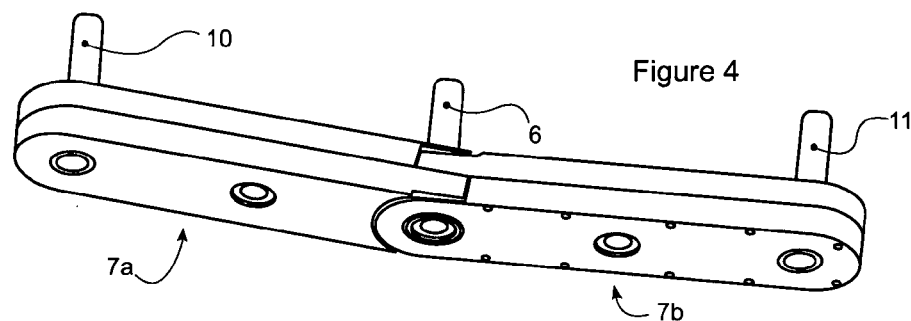
FIG. 4 shows an enlargement of the schematic view of the mechanism with hinged arms, on the side of the chassis, with a protection cover.
Figure 5:
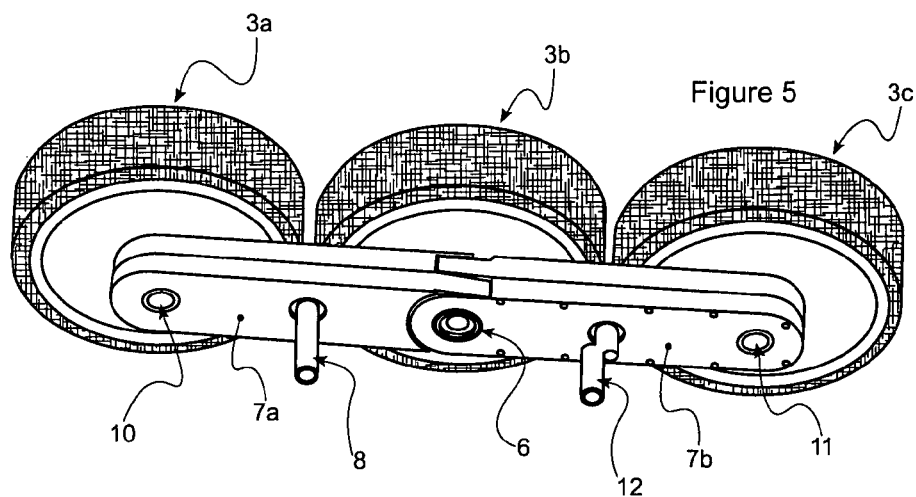
FIG. 5 represents a perspective view of the mechanism with hinged arms equipped with wheels and showing two shafts connected to the chassis.

FIGS. 3 to 5 allow seeing one possible configuration of the mechanism with hinged arms (7a, 7b) in more detail.

This mechanism is comprised of two arms (7a, 7b) hinged by means of a pivoting connection. Each hinged arm (7a, 7b) corresponds to a machined work-piece having an oblong shape and having a portion (13) where the thickness is reduced at the level of the central joint and which includes three holes (14a, 14b, 14c) distributed in the center and at each end. These holes are capable of accommodating bearings, in which is inserted either the motor shaft (8) or the axis such as a crankshaft (12) or a wheel axle (6 or 10 or 11). The hinged arms (7a, 7b) overlap at the level of the portion (13), so as to form a mechanism having a uniform thickness with a front arm (7a) and a rear arm (7b). Without exceeding this thickness, protrusions (22) are provided for on the face of the arms on the side of the wheels, in order to guide the passing-through of the driving chains (9a, 9b, 9c).

Figure 7A:
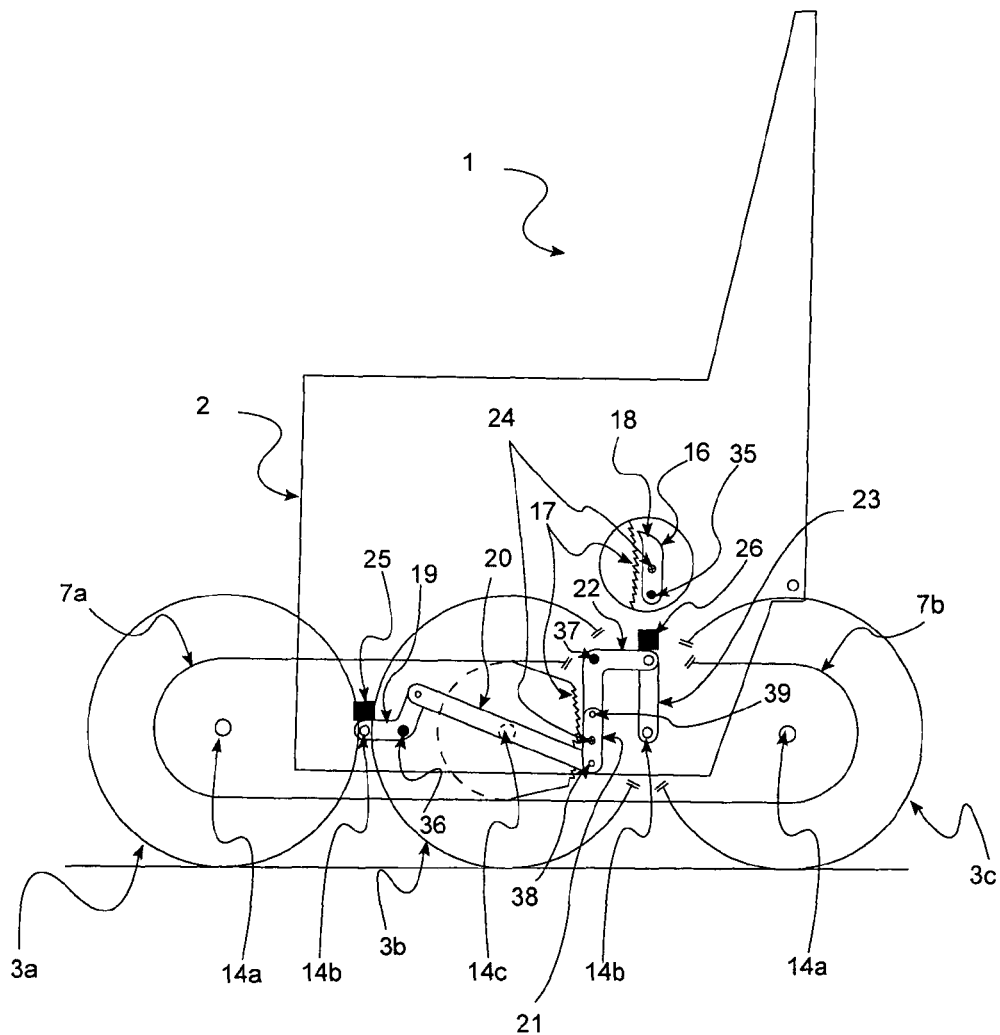
FIG. 7a shows a schematic view of the wheelchair equipped with the anti-tilting device.

FIG. 7a shows the anti-tilting device. It is installed on each lateral side of the chair (1).

This device comprises a pawl (16) for blocking the pivoting of the front (7a) and rear (7b) arm, which it is connected to by means of a double linkage. The pawl (16) cooperates with a toothed edge (17) located at the rear of the front arm (7a). The pawl (16) consists of a rectilinear rod hingedly connected to the chassis (2) by the shaft (35) and ending with a tip (18) oriented toward the toothed edge (17), the shape of the tip (18) being designed to be inserted in one of the notches.

Each linkage consists of a knee-joint comprised of an angle-shaped rod (19, 22) hingedly connected to the chassis (2) at the level of the shafts (36, 37) and of a rectilinear rod (20, 23). The distal rods (19, 23) of the pawl (16) are hinged with respect to the central axis (14b) or the front arm (7a) and the rear arm (7b), respectively. The proximal rods (20, 22) of the pawl (16) are in turn hinged at both ends (38, 39) of a connecting rod (21) including a rectilinear pin (24), about which the pawl (16) pivots.

Stops (25, 26) belonging to the chassis (2) limit the upward movement of the distal connecting rods (19, 23).

Figure 7B:
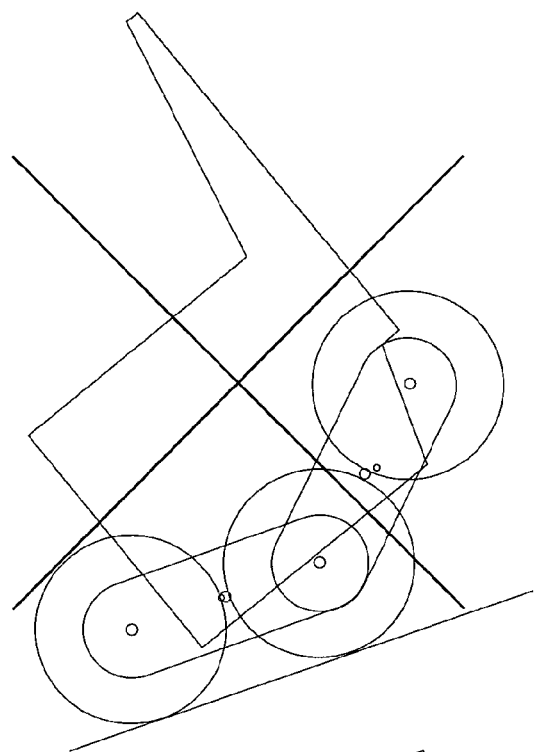
Figure 7C:
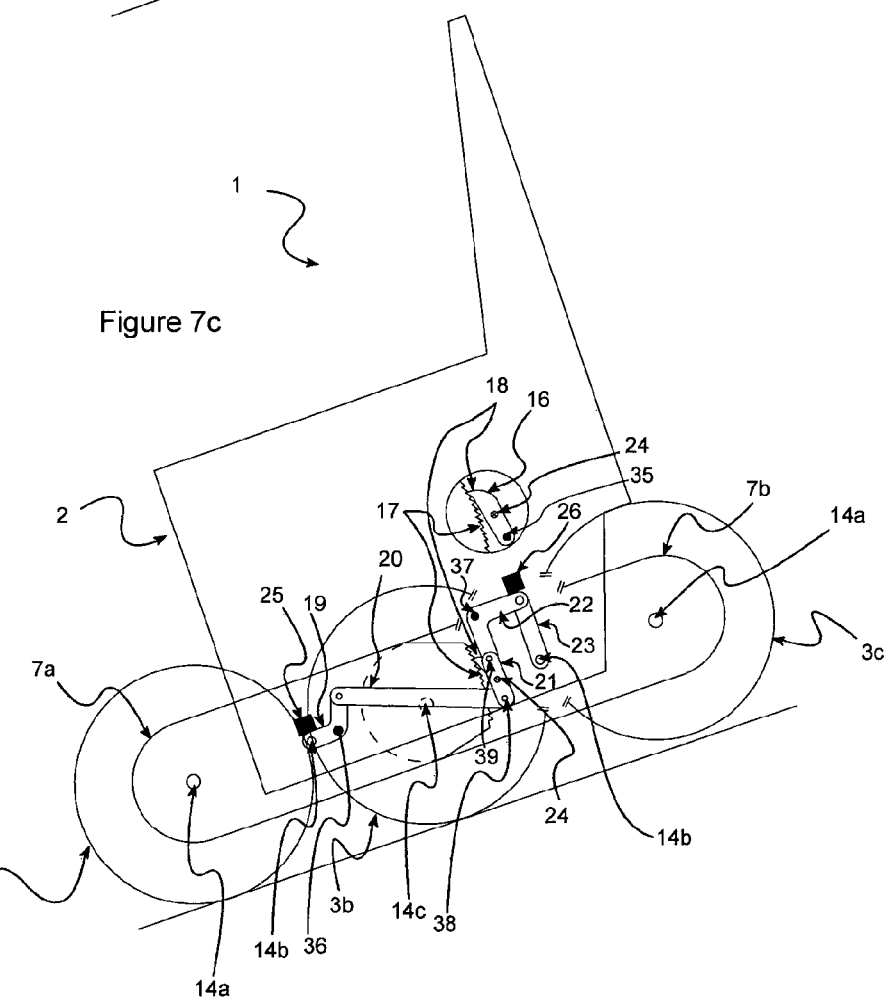

As shown in FIG. 7c, when the wheelchair (1) leans forward, the rear portion of the chassis (2) rises, and the stop (26) moves away from the rod (23) and a fortiori the rear arm (7b). This change in distance between the chassis (2) and the rear arm (7b) causes the tilting of the knee joints, which cause the connecting rod (21), then the pawl (16) to pivot, allowing the tip (18) to insert into a notch blocking any pivoting of the hinged arm (7b) with respect to its axis (14b) for maintaining it to the chassis (2).

Indeed, when the rear part of the chassis (2) rises, it tends to pull the rear arm (7b) and the rear wheel (3c) upwards. Now, by their own weight, the latter tend to exert a force toward the ground.

If the rear wheel (3c) is slightly off the ground, then the linkage blocks the pivoting of the hinged arms (7a, 7b) at the level of the axle (14c) of the central wheel (3c), preventing any further movement of the rear wheel (3c) and any risk of tilting of the wheelchair (1).

It works the same way when the wheelchair (1) leans backward and tends to want to lift the front wheel (3a), as shown in FIG. 7e.

FIGS. 7b and 7d represent the chair without anti-tilting device. In this case, the rear wheel or the front wheel is raised completely and causes the tilting of the chair.

Figure 8A:
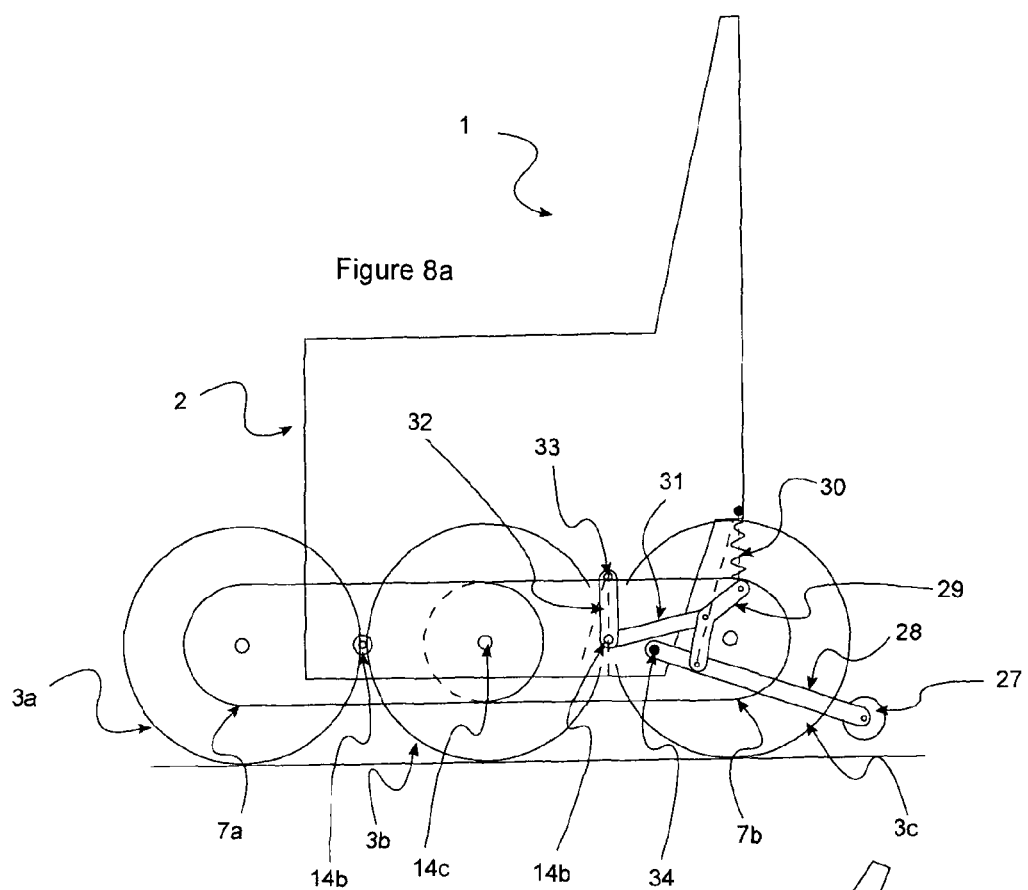
FIGS. 8a and 8b show schematic views of the chair provided with a device for assisting in passing an obstacle.
Figure 8B:
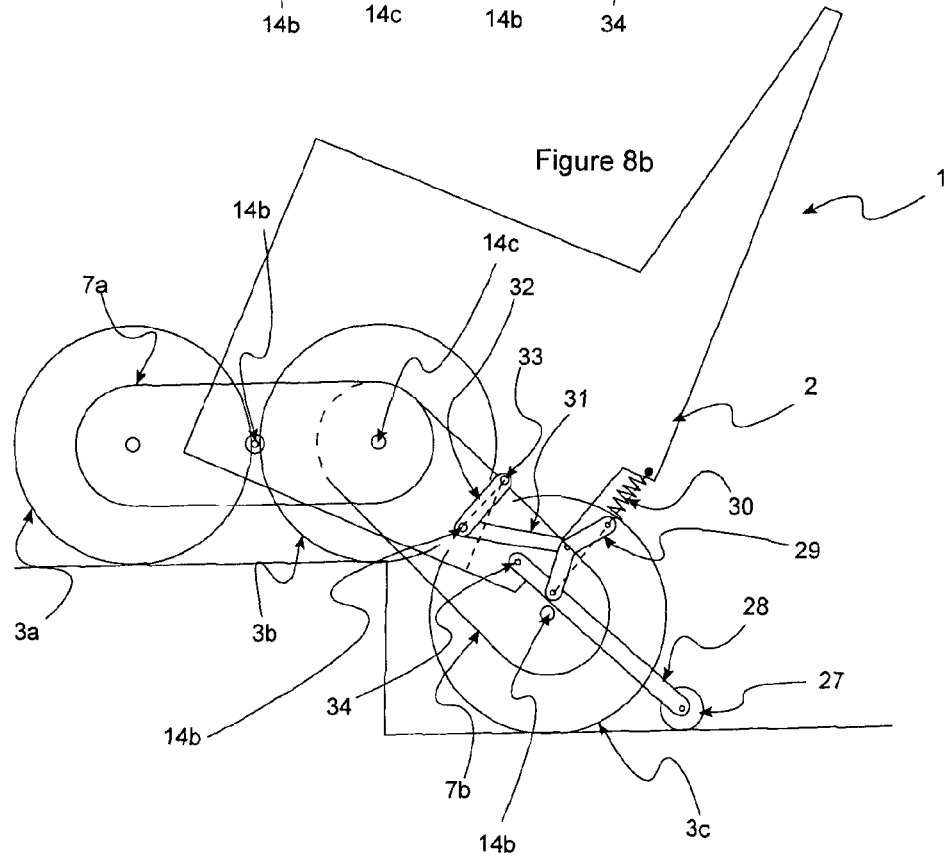

FIGS. 8a and 8b illustrate a wheelchair equipped with a device for assisting in crossing an obstacle.

In FIG. 8a, the device is in the initial position, during the rolling of the wheelchair on a flat ground. In FIG. 8b, the assisting device is under pressure, the rear wheel of the wheelchair being in the process of crossing an obstacle.

This device for assisting in crossing is installed on each lateral side of the chair (1).

Specifically, it includes an anti-tilting wheel (27) located at the rear of the chair (1) and fixed to a first end of a rod (28), its second end (34) being hingedly connected to the chassis (2). A bent rod (29) connects the rod (28) by pivoting to both a damper (30) with an axial spring hingedly connected to the chassis (2), and to a knee-joint ensuring a linking to the rear arm (7b) while being hingedly connected to the chassis (2) at the level of its distal end (33) of the bent rod (29). More specifically, the knee-joint is comprised of two straight rods (31, 32) hingedly connected to each other at the level of the central axis (14b) of the rear arm (7b).

When the wheelchair rolls on a flat ground, as shown in FIG. 8, the anti-tilting wheel is maintained in raised position with respect to the ground, the damper (30) being decompressed.

When crossing an obstacle, the chair (1) necessarily tilts backward and the wheel (27) then touches the ground. At the same time, the arms (7a, 7b) are no longer aligned, but form an angle, and the position of the central axis (14b) of the rear arm (7b) with respect to the chassis (2) changes. This change in position results into a pivoting of the rod (32) about the end (33). This pivoting of the knee-joint causes the nearing of the bent rod (29) to the chassis (2), this reduction in distance being compensated by the compression of the damper (30) transferring onto the wheel (27), resting on the ground, part of the weight exerted on the rear wheel (3c) and thus facilitating the crossing of the obstacle.

I claim:

1. Device for crossing obstacles in a motorized vehicle, said device comprising:
   a chassis connected to an n number of wheels on a lateral side of said chassis, wherein n is an integer having a value of at least three;
   a means for rotating the wheels; and
   a plurality of n−1 arms supporting each wheel, the arms being hingedly connected to each other at a shared pivoting axis, said shared pivoting axis being aligned with an axis of rotation of at least one wheel between other on which the n−1 wheels, each of n wheels being pivotable with respect to a corresponding axis of rotation of an adjacent wheel,
   wherein said chassis is connected to each arm through a corresponding shaft mounted and freely rotating, at least one shaft compensating for change in distance between corresponding shafts when respective arms are actuated.

2. Device for crossing obstacles according to claim 1, further comprising: a motor shaft connecting said means for rotating and at least one arm.

3. Device for crossing obstacles according to claim 2, wherein said motor shaft rotates the wheels through transmission means arranged between the motor shaft and wheel axles of the wheels.

4. Device for crossing obstacles according to claim 1, wherein wheels on a left side are powered by a left side driving means independent from a right side driving means powering wheels on a right side.

5. Device for crossing obstacles according to claim 1, wherein at least one shaft is comprised of a crankshaft.

6. Device for crossing obstacles according to claim 5, wherein said crankshaft shaft is comprised of a first shaft section connected to a hinged arm and a second shaft section connected to the chassis, the two shaft sections being hinged with respect to each other by a connecting rod.

7. Device for crossing obstacles according to claim 1, wherein at least one shaft is comprised of a sliding shaft in a horizontal plane.

8. Device for crossing obstacles according to claim 1, further comprising:
   an anti-tilting device comprising means for blocking pivoting of at least one arm when the chassis is tilting, said anti-tilting device being provided on one side selected from a group consisting of a front side and a rear side.

9. Device for crossing obstacles according to claim 8, wherein said means for blocking is comprised of a pawl, locking pivoting of rear and front arms, respectively, and being connected to a double linkage transforming change in distance between the chassis and the arms into a movement of the pawl so that one of end of said pawl cooperates with a toothed edge and said blocking means locking said pivoting.

10. Device for crossing obstacles according to claim 9, wherein said double linkage is comprised of a knee-joint, having distal rods of said pawl driven by the front or rear arm, respectively, and proximal rods of said pawl hingedly connected to both ends of a rod, said rod being comprised of a hinge bolt pivoting the pawl, one end of said hinge bolt hingedly connected to the chassis, one of the rods of each knee-joint being also hingedly connected to the chassis.

11. Device for crossing obstacles according to claim 1, further comprising:
   an anti-tilting wheel at a rear of said chassis, fixed to one end of a rod hingedly connected to the chassis and a rod connecting said anti-tilting wheel to a damping means, said rod being pivotally connected to a knee-joint, said damping means having a distal rod hingedly connected to the chassis in front of a central axis of a rear arm and to said rear arm at a level of said central axis,
   wherein the arms pivot a position of a front wheel, said front wheel being maintained in a raised position when running on a flat surface and pressed in a lowered position when a rear wheel is crossing an obstacle.

12. Device for crossing obstacles according to claim 11, wherein the damping means is comprised of a rod having a variable length, said damping means being comprised of a cylinder with an axial spring, pivotally mounted on the chassis, being elastically compressed when the anti-tilting wheel is applied on a ground surface.

13. Device for crossing obstacles according to claim 1, wherein at least one set of wheels is equipped with flexible high blades in a direction of the respective axis of pivoting of the wheels.

14. Device for crossing obstacles according to claim 1, wherein at least one set of wheels is equipped with omnidirectional wheels.

15. Device for crossing obstacles according to claim 1, further comprising:
   additional wheels added between two adjacent wheels, laterally in recess with respect to existing wheels.

16. Device for crossing obstacles according to claim 1, wherein at least one wheel mounts on a flexibly rotating hub, a freewheel hub, or both.

17. Motorized vehicle equipped with a device for crossing obstacles according to claim 1, comprising a tilting user seat positioning the seat horizontally in all circumstances by a level sensor.

* * * * *